United States Patent
Roth

[19]

[11] Patent Number: 5,979,153
[45] Date of Patent: Nov. 9, 1999

[54] AGRICULTURAL BALER

[75] Inventor: Arsene Roth, Metz, France

[73] Assignee: Claas KGaA, Harsewinkel, Germany

[21] Appl. No.: 08/835,079

[22] Filed: Apr. 4, 1997

[30] Foreign Application Priority Data

Apr. 6, 1996 [DE] Germany ............................ 196 13 861

[51] Int. Cl.$^6$ ................................................. A01D 39/00
[52] U.S. Cl. ................................ 56/341; 100/88; 100/89
[58] Field of Search ................................. 56/341; 100/88, 100/89

[56] References Cited

U.S. PATENT DOCUMENTS

| | | | |
|---|---|---|---|
| 4,788,900 | 12/1988 | Berkers | 100/88 |
| 5,408,817 | 4/1995 | Wagstaff | 56/341 |
| 5,447,022 | 9/1995 | Webb | 56/341 |

FOREIGN PATENT DOCUMENTS

| | | |
|---|---|---|
| 3811649C1 | 6/1989 | Germany. |
| 4222518A1 | 1/1994 | Germany. |

*Primary Examiner*—H. Shackelford
*Attorney, Agent, or Firm*—Michael J. Striker

[57] ABSTRACT

An agricultural baler has a pickup elements, a conveyor transporting a harvested product stream picked up from a field by the pickup element, a baling chamber for baling the harvested product, a transferring element for transporting the harvested product from the conveyor to the baling chamber, the transferring element including a cylinder and a plurality of disks arranged on the cylinder, and a plurality of strippers extending into spaces between the disks for preventing winding of the harvested product on the disks, the strippers being formed as sensing brackets for sensing deviation of the strippers. Also a deviation of knife blades arranged in spaces between the neighboring disks and offset relative to the strippers can be evaluated as well.

11 Claims, 3 Drawing Sheets

AGRICULTURAL BALER

BACKGROUND OF THE INVENTION

The present invention generally relates to agricultural balers.

More particularly, it relates to an agricultural baler which includes substantially a pickup element, a conveyor which transports a harvested product stream picked up from a field, and a transferring device which conveys the collected product stream in direction toward a bailing chamber.

The balers of the above mentioned general type are known in the art. In the known balers the transferring device is composed of several profiled disks which are fixedly mounted on a cylinder, the baler has sensors which are formed as pivotable sensing brackets located between the pressing chamber for detecting the harvested product stream over the width, an evaluating device connected with the sensors, and adjusting means connected with the evaluating device. Such a known baler is disclosed for example in the German patent document DE 38 11 694 C1. In this known baler the pivotable sensing bracket which are supported at one end and distributed over the width of the pickup element are connected with measuring sensors. In correspondence with the height of the harvested product stream picked up by the pickup device, the sensing brackets are deviated more or less. This deviation is registered by the measuring sensors mounted on the sensing brackets and supplied to the evaluating device as electric values. The evaluating device can be connected with adjusting means for lateral displacement of the conveyor which centrally accumulates the harvested product stream for uniform loading of the baler. This adjusting means can be formed as a cylinder for influencing the steering of the baler. Furthermore, this known baler provides for the possibility for orienting the evaluating device for accurate detection of the picked up harvested product quantity. Generally the operation of such balers is satisfactory.

However, the arrangement of the deviated detecting brackets is structurally difficult and very cost-consuming and they present obstacle for driving as well. Also, a sensing of the harvested product layer which is partially very loose is possible only to a limited extent.

SUMMARY OF THE INVENTION

Accordingly, it is an object of present invention to provide a baler of the above mentioned general type, which avoids the disadvantages of the prior art.

More particularly, it is an object of present invention to provide a baler of the above mentioned type in which the additional mounting of deflecting sensing elements is not needed.

In keeping with these objects and with others which will become apparent hereinafter, one feature of the present invention resides, briefly stated, in a baler of the above mentioned type, in which the strippers which are formed in the space between the individual profiled disks for preventing winding of the harvester product stream on the disk operate as sensing brackets, so that the deviation of the individual strippers caused by the pressure of the harvested product is detected and evaluated in an evaluating device connected with the strippers.

When the baler is designed in accordance with the present invention, it eliminates the disadvantages of the prior art and provides for above mentioned highly advantageous results.

In accordance with a further advantageous feature of the present invention, the strippers can be provided with resistance strain gauges.

Instead of the resistance strain gauges, it is of course possible to use a rotary angle transducers, inductive or capacitive position sensing systems, or other known measuring systems.

In the harvesting machines of this type the drum-shaped transferring devices are selectively designed so that they simultaneously comminute the harvested product. For this purpose, a system of knife blades is provided which extend similarly to the strippers, with their cutting zone into the ring gap between two neighboring disks. Each knife blade is rotatably supported on a transverse shaft and held in its angular position via a spring bar. This is disclosed for example in the German patent document DOS 42 22 518. During loading, the knife blades can deviate rotatingly around the transverse shaft. This rotary movement can be also detected as in the case of the strippers, by a rotary angle sensors etc. and utilized for the above mentioned purpose.

The great advantage of the baler designed in accordance with the present invention, is that the stripper which belongs to each transferred device is utilized as a sensing bracket. It is therefore no longer necessary to mount additional sensing arms in the region of the harvested product pickup.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
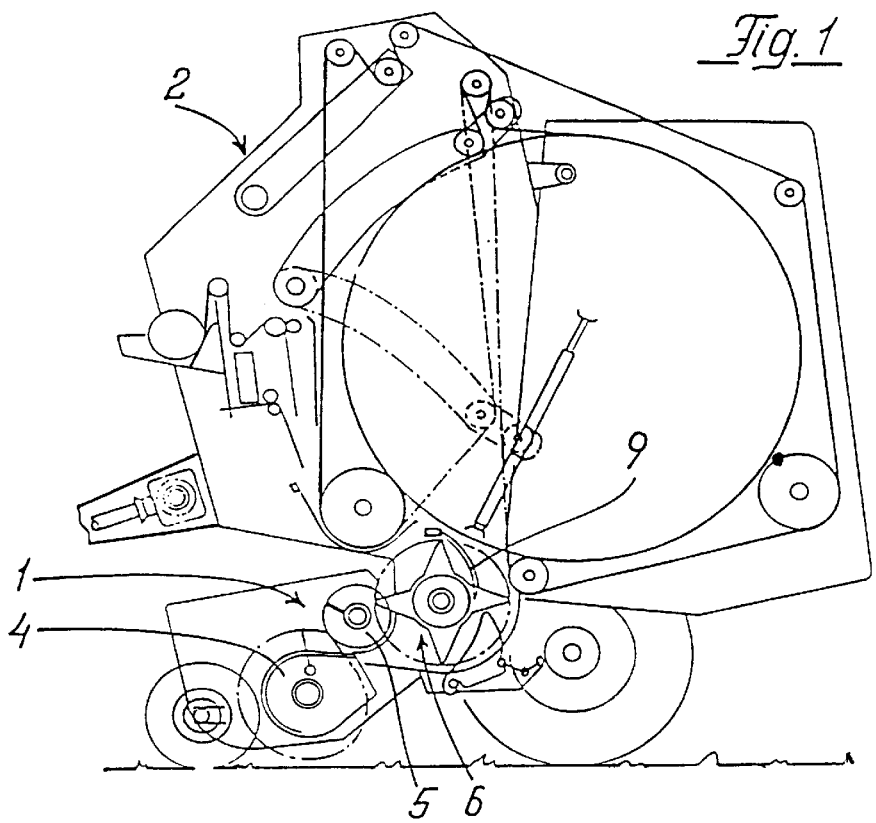
FIG. 1 is a side view of a round baler in accordance with the present invention.

A round baler 2 as well as a piston baler 3 in accordance with the present invention have a substantially identical region in which a harvested product is picked up and transported further. This region is identified as a whole with reference numeral 1. This region substantially includes a pickup device 4, at least one screw conveyor 5 which centrally accumulates and transports the picked harvested product stream, and a transferring device 6.

Figure 4:
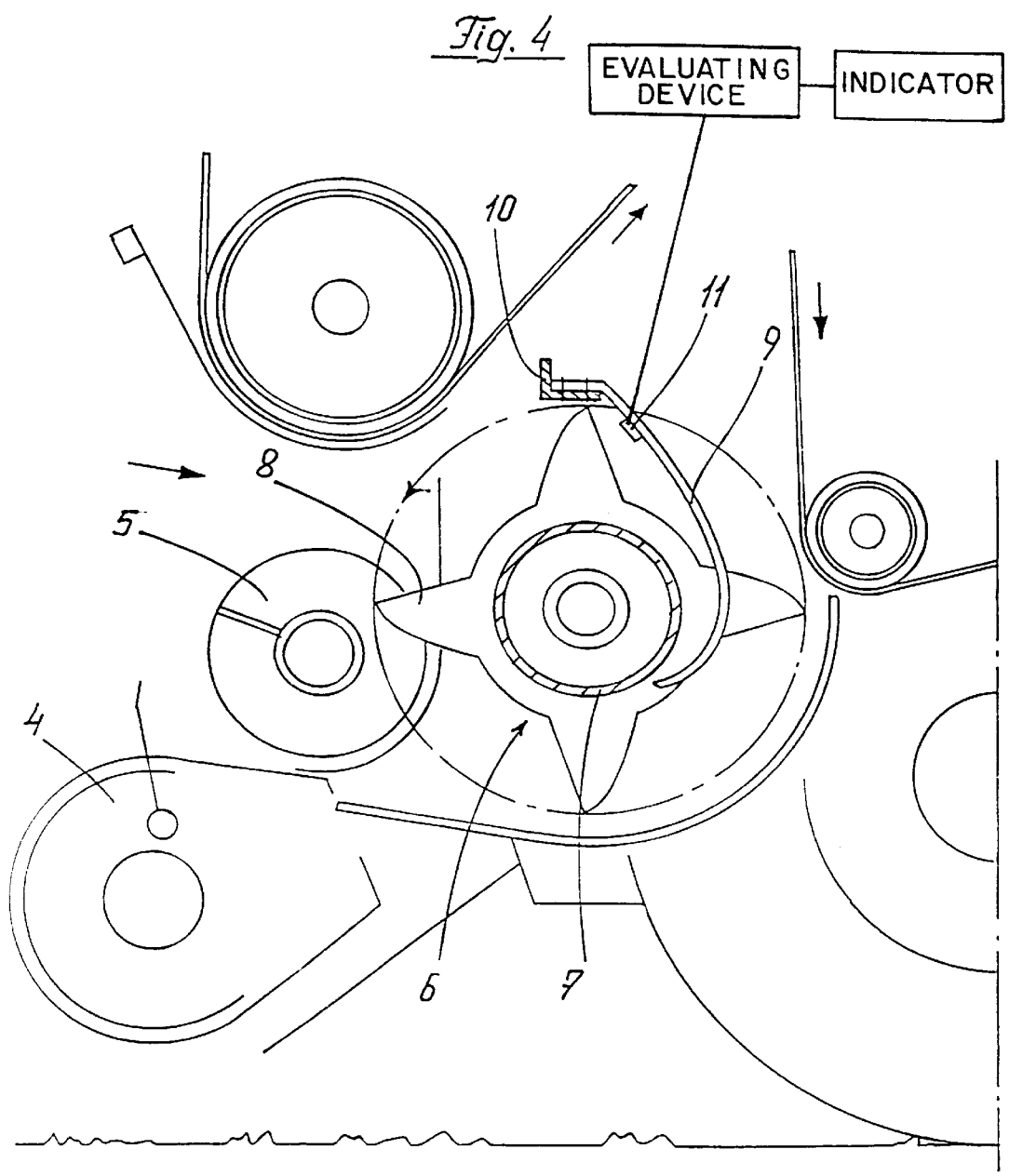
FIG. 4 is a side view of the region of the inventive baler shown in FIG. 3.

The transferring device 6 includes a cylinder 7 with a plurality of profiled disks 8 which are mounted on the cylinder 7 uniform distances from one another. Strippers 9 extend into spaces between the individual disks. As shown in FIG. 4, the strippers 9 are screwed at one end to a supporting profile 10 which is fixed to the machine. Wire strain gauges 11 are glued to the strippers 9 and connected through a not shown conductors with a known evaluating device.

The product stream flowing into the machine is transported by the transferring device 6 into the inlet gap of a baling chamber of the baler 2 or 3. The strippers 9 strip the harvested product in a quasi fashion from the transferring device 6, so as to effectively prevent winding of the harvested product by the disks 8 and to secure the product flow in direction toward the pressing chamber of the baler.

Since the flowing in harvested product stream can be on the one hand non uniformly high and on the other hand non uniformly dense over the width, the individual strippers 9 deviate over different distances. In particular, they are designed so that their free deviating ends are pressed more or less strong in direction of the cylinder 7. In correspondence with the mechanical loading of the individual strippers 9, different electrical values are produced by the wire strain gauges 11 and supplied in a known matter to an evaluating device. Thereby, as explained in detail in the German patent document DE PS 38 11 649 which is incorporated here as a reference, the total volume is determined which loads the steering or axially offsets the conveyor which centrally accumulates the harvested product.

Figure 2:
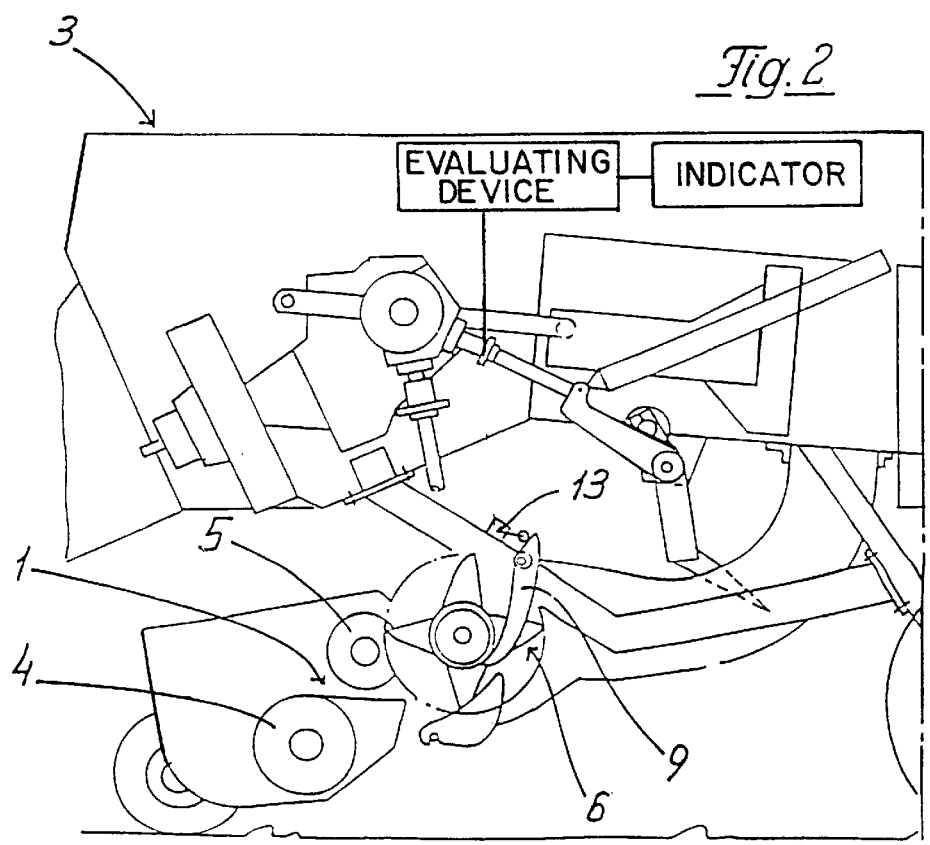
FIG. 2 is a side view of a front part of a piston baler in accordance with the present invention.
Figure 3:
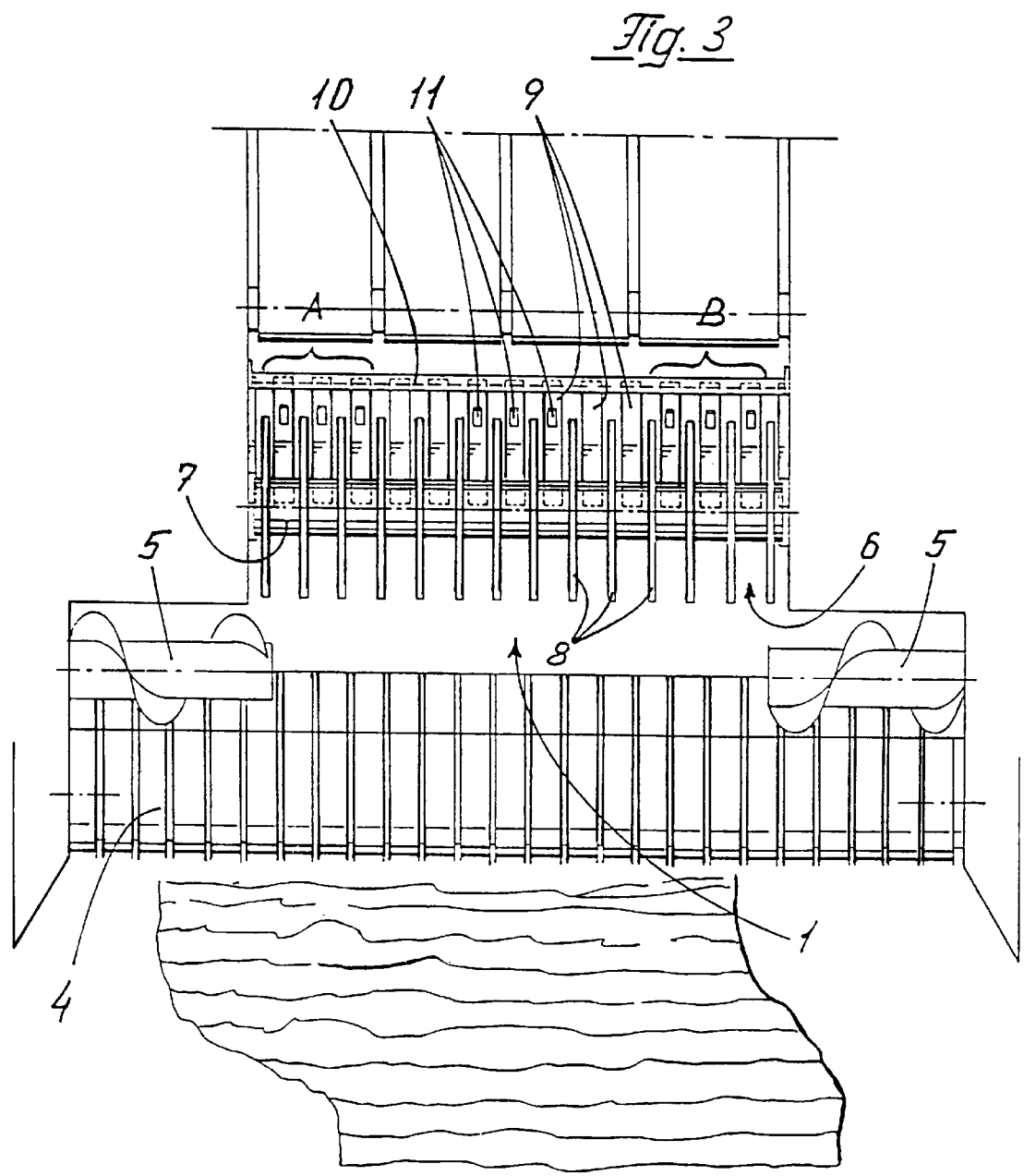
FIG. 3 is a plan view of a front part of the round baler of FIG. 1 on an enlarged scale.

While in the embodiment shown in FIG. 4, the wire strain gauges 11 are glued to the strippers 9, it is of course possible to provide rotary angle transducers 13 which cooperate with the strippers 9 as shown in FIG. 2. In accordance with the present invention, the inventive idea can be used not only in the machine shown in the drawings, but also for other harvesting machines provided with devices for receiving a harvested product, for example collecting car loaders, etc.

The individual strippers can be formed as measuring points. The strippers can be assembled over the total width of the transferring device in groups relative to the measuring point. The evaluating device can supply to an indicating device the measuring values of the deviation of the strippers either from one end region A of the transferring device, or from the other end region B of the transferring device, or over from the total width of the transferring device.

It is also possible to determine a deviation under loading of knife blades which are arranged on the periphery of the transferring device in the ring gaps between two neighboring disks 8 with offset relative to the strippers 9. The deviation of the knife blades during loading can be determined by the rotary angle transducer and the corresponding values can be supplied to the evaluating device.

It will be understood that each of the elements described above, or two or more together, may also find a useful application in other types of constructions differing from the types described above.

While the invention has been illustrated and described as embodied in agricultural baler, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An agricultural baler, comprising pickup means; a conveyor transporting a harvested product stream picked up from a field by said pickup means; a baling chamber for bailing the harvested product; transferring means for transporting the harvested product from said conveyor to said baling chamber, said transferring means including a cylinder and a plurality of disks arranged on said cylinder; and a plurality of strippers extending into spaces between said disks for preventing winding of the harvested product on said disks, said strippers being formed as sensing brackets which in the absence of a harvested product stream in the baler are arranged in an initial condition, and under the action of a harvested product stream deviate from the initial condition so that the deviation of said sensing brackets is evaluatable.

2. An agricultural baler as defined in claim 1; and further comprising evaluating means connected with said strippers for evaluating the deviation of said strippers.

3. An agricultural baler as defined in claim 2; and further comprising wire strain gages mounted on said strippers and connected with said evaluating means.

4. An agricultural baler as defined in claim 2; and further comprising rotary angle transducers associated with said strippers for sensing a rotary angle deviation of said strippers, said rotary angle transducers being connected with said evaluating means.

5. An agricultural baler as defined in claim 1, wherein each of said strippers forms a measuring point for measuring the deviation of each of said strippers.

6. An agricultural baler as defined in claim 5, wherein said strippers are distributed over a total width of said transferring means and assembled in groups relative to said measuring points.

7. An agricultural baler as defined in claim 2; and further comprising indicating means connected with said evaluating means, so that said evaluating means supply a measuring value of the deviation of said strippers to said indicating means.

8. An agricultural baler as defined in claim 7, wherein said transferring means have two end regions and a predetermined width, said evaluating means supplying the measuring values to said indicating means selectively from one end region of said transferring means, from another end region of said transferring means, and over a total width of said transferring means.

9. An agricultural baler, comprising pickup means; a conveyor transporting a harvested product stream picked up from a field by said pickup means; a baling chamber for baling the harvested product; transferring means for transporting the harvested product from said conveyor to said baling chamber, said transferring means including a cylinder and a plurality of disks arranged on said cylinder; and a plurality of strippers extending into spaces between said disks for preventing winding of the harvested product on said disks; a plurality of knife blades provided on said transferring means, said knife blades being arranged in said spaces between two neighboring disks in an initial condition in the absence of a harvested product flow and deviatable from the initial condition during loading by the harvested product flow; and means for detecting the deviation of said knife blades during loading.

10. An agricultural baler as defined in claim 9, wherein said means for detecting include rotary angle transducers.

11. An agricultural baler as defined in claim 10; and further comprising evaluating means connected with said rotary angle transducers for evaluating the deviation of said knife blades detected by said rotary angle transducer.

* * * * *